United States Patent [19]

Skiven et al.

[11] 4,314,830
[45] Feb. 9, 1982

[54] SIDE STREAM SEPARATOR FOR BOILER PARTICULATE EMISSION CONTROL

[75] Inventors: David A. Skiven, Plymouth Township, Wayne County; Charles J. Sortor, St. Clair Shores; Raymond J. Tessier, Allen Park, all of Mich.

[73] Assignee: General Motors Corporation, Detroit, Mich.

[21] Appl. No.: 142,972

[22] Filed: Apr. 23, 1980

[51] Int. Cl.³ .................. B01D 50/00; C21B 7/22
[52] U.S. Cl. .................................. 55/217; 55/266; 55/269; 55/315; 55/344; 55/385 D; 266/155; 266/157
[58] Field of Search ............. 55/217, 261, 266, 269, 55/270, 315, 337, 344, 385 D, 347, 348; 266/155, 157

[56] References Cited

U.S. PATENT DOCUMENTS

| | | | |
|---|---|---|---|
| 1,508,367 | 9/1924 | Matlock | 55/261 |
| 3,173,980 | 3/1965 | Hysinger | 55/217 |
| 3,266,225 | 8/1966 | Barr | 55/269 |
| 3,716,967 | 2/1973 | Doyle, Jr. et al. | 55/217 |
| 3,877,454 | 4/1975 | Axmann et al. | 55/337 |
| 3,986,848 | 10/1976 | Howell | 55/315 |
| 4,204,848 | 5/1980 | Schulmeister | 55/269 |

FOREIGN PATENT DOCUMENTS 2551374  5/1977  Fed. Rep. of Germany ........ 55/217

OTHER PUBLICATIONS

Western Precipitation Multiclone Dust Collectors (M-274), Joy Manufacturing Company, p. 5.
Chemical Engineering (Deskbook-Environmental Engineering), Oct. 6, 1975, p. 17.

Primary Examiner—David L. Lacey
Attorney, Agent, or Firm—Lawrence B. Plant

[57] ABSTRACT

Device for controlling the particulate emission from coal-fired boilers including a cyclone type primary separator between the boiler and the stack and a bag filter coupled in side stream relation to the cyclone separator such as to shunt and departiculatize up to about 20% of the gas stream entering the cyclone. The shunted gas is drawn from below the tube sheet of the cyclone separator, filtered through the bags and returned to the stack. Means are provided to control the temperature of the shunted gas within defined limits corresponding to the acid dew point of the gas and the thermal degradation temperature of the filter media.

1 Claim, 3 Drawing Figures

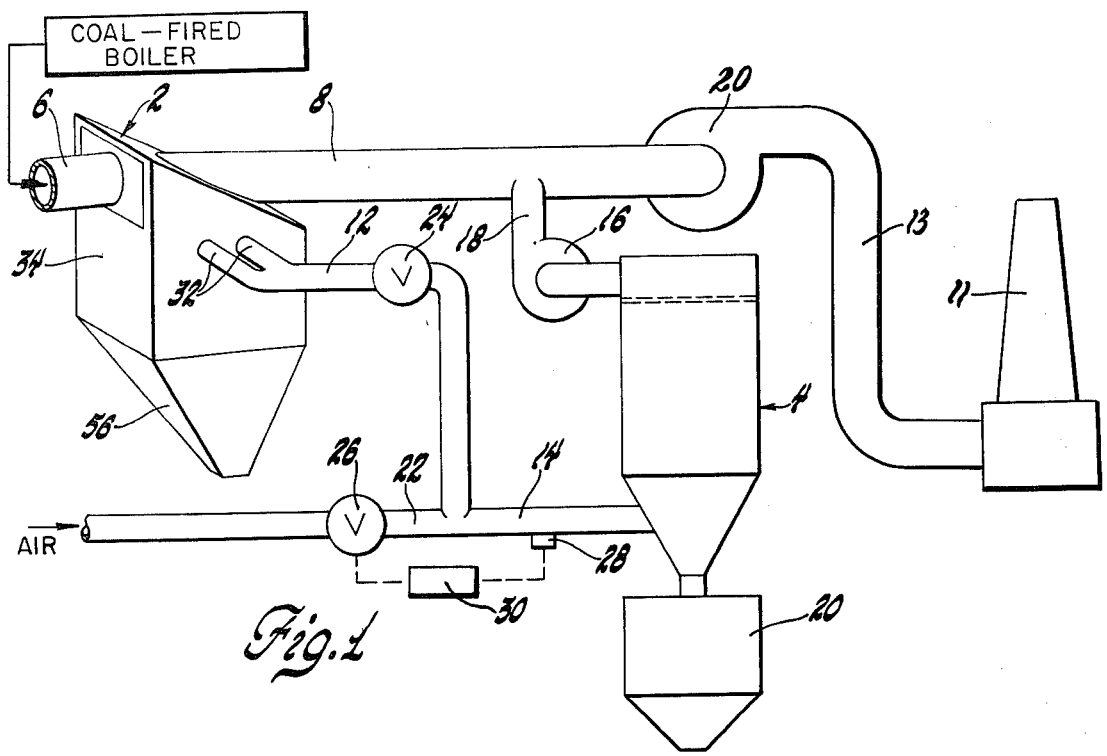
Fig. 1
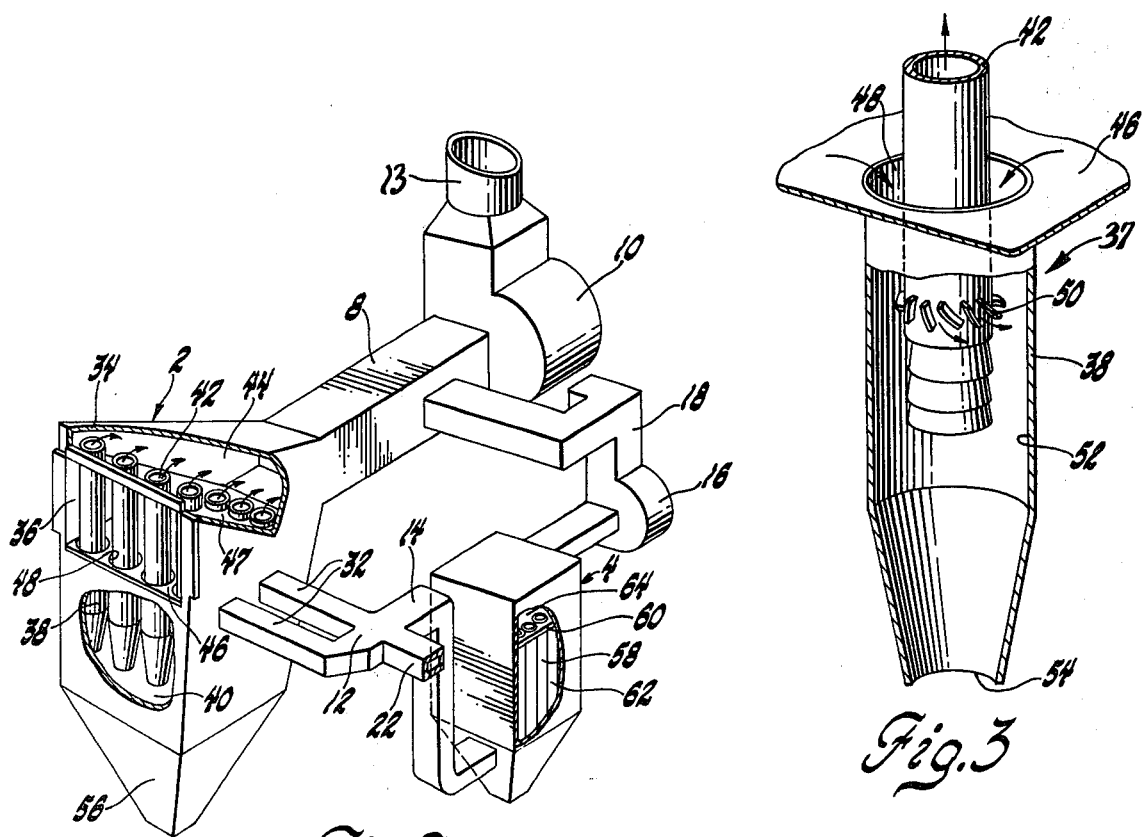
Fig. 2
Fig. 3

SIDE STREAM SEPARATOR FOR BOILER PARTICULATE EMISSION CONTROL

BACKGROUND OF THE INVENTION

This invention relates to coal-fired boilers and more particularly to particulate emission control devices therefor.

Coal-fired boilers produce combustion gases rich in particulates. Mechanical collection devices of the cyclone-type are normally employed to remove the particulates from the gases and generally achieve about 94% removal at a cost of about $2.00 per pound of steam.

A cyclonic mechanical collector is a cluster of tubes through which effluent gas is passed. See FIG. 2. Each of these tubes, one of which is schematically portrayed in FIG. 3, contains within it a smaller tube, on which vanes are affixed which act very much like fan blades. As the effluent gases enter the collector, they pass between the inner and outer tubes, and the vanes impart to the entering gas a cyclonic, downward motion creating an outer vortex moving down the collection tube. The centrifugal force of this entering vortex forces particulate matter outward against the walls of the collection tube, where it proceeds downward, falling by gravity toward the hopper at the bottom of the tube. The swirling gas is tightened into a smaller vortex by gradually tapering the bottom portion of each tube, and near the bottom it reaches a point of equilibrium, reverses direction, and passes up through the center of the inner tube, helped along by suction from the induced draft fan, for expulsion through the stack. The particulate matter which has been forced outward by the cyclonic motion of the entering gas stream falls out of the gas stream at the point of equilibrium and is collected in a dust hopper at the bottom of the tube.

With respect to particulate greater than 10 microns in size, this design works very well. For very fine particulate, however, two factors combine to reduce the removal efficiency of the mechanical collector. First, the fine particulate is less susceptible to the centrifugal forces which propel the matter outward. Thus, as the gas stream moves down the tube, a relatively lower proportion of the fine particulate is thrust to the outside and a relatively greater proportion remains suspended in the gas stream as it reverses direction for expulsion through the stack. Second, the sudden reversal in direction of flow that occurs at the bottom of the collecting tube has a tendency to reentrain some of the fine particulate matter that has been propelled to the outside of the outer vortex.

For environmental reasons, it is considered desirable to reduce particulate emissions even further. More efficient devices such as full stream bag houses are capable of removing another 2% or 3%, but at a cost of approximately $12.00/lbs of steam. Likewise, electrostatic precipitators are capable of removing additional particulates, but also at significantly increased cost. In this regard, such full stream devices require considerable space for installation, require significant capital investment and have well known operational problems and associated costs. Still other systems involving wet scrubbing a fraction of the boiler effluent passing through the cyclone will reduce particulate emissions, but again at higher cost, higher maintenance and creation of an additional environmental problem (i.e., water treatment).

It is an object of the present invention to provide a relatively economical adaptation to cyclonic separators for reducing the particulates emitted from coal-fired boiler systems to more environmentally acceptable levels. This and other objects and advantages of the present invention will become more readily apparent from the description thereof which follows.

BRIEF DESCRIPTION OF THE INVENTION

The present invention contemplates a multitube cyclone-type primary separator coupled with a secondary bag filter type separator for substantially departiculatizing a portion (i.e., up to about 20%) of the cycloned gases and means for controlling the temperature of the gases entering the bag filter within the range defined by the acid dew point of the gases and the thermal degradation temperature of the filter media (i.e., the bags in the bag filter). The inlet to the bag filter is plumbed so as to withdraw the gases from the cyclone at a location therein which is just below the tube sheet which serves to hold the tubes and divide the cyclone in half (i.e., into an inlet chamber and an exit chamber). The additional downward "pull" at this location tends to reduce reentrainment of small particles (i.e., less than 10 microns) in the gases leaving the cyclone and causes additional particulates (i.e., large and small) to fall into the cyclone's ash hopper. Hence, it appears that the bag filter coupled in side stream relation to the cyclone filter not only passes a highly loaded portion of the gas stream through an absolute filter (i.e., the bags) but actually increases the efficiency of the cyclone separator itself. The substantially departiculatized gas from the bag filter is then returned to and dilutes the gases leaving the cyclone.

Bag houses rely on a woven or felted porous fabric media (i.e. bags) to filter out the particulates. Typical materials include polyamides, polytetrafluoroethylene (PTFE), PTFE-coated fiberglass among others. These materials are sensitive to thermal degradation (e.g., charring or burning) if the temperatures are too hot and acid degradation (e.g., decomposition) if the gases fall below the acid dew point (i.e., about 240°–280° F.). For example, the polyamide (i.e., Nylon) felts have an upper limit of about 400° F. while the PTFE and PTFE-coated glass have an upper limit of about 450° F.

In accordance with the present invention, the temperature of the gas stream entering the bag house from the cyclone is automatically controlled within the aforesaid burn-dewpoint range and preferably in the range of about 300°–400° F. This may be accomplished in a number of ways. In one embodiment for example, the exhaust or combustion gases from the boiler are passed in heat exchange relation with the combustion air used in the boiler furnace so as to preheat the combustion air while at the same time reducing the temperature of the exhaust gases (typically about 500°–600° F.) entering the cyclone to within the control range (i.e., 300°–400° F.). Appropriate means are employed to monitor the temperature of the gases entering the bag house and, in response thereto, to modulate the extent of combustion air preheat. In another embodiment, the gas stream leaving the cyclone and entering the bag house can be directly cooled in an appropriate heat exchanger (e.g., ambient air) inserted in the ductwork between the cyclone and the bag house. In a preferred embodiment, means are provided in the ductwork coupling the cyclone and the bag house to admit ambient air into that ductwork in an appropriate amount to dilution cool the gas stream therein to within the requisite range (i.e., 300°–400° F.). The amount of ambient air admitted to the stream entering the bag house can be done (manually) or automatically. Preferably, a motor controlled valve responsive to the temperature of the gas at the inlet to the bag house modulates the ambient air input for dilution cooling. High and low temperature alarms (i.e., audible/visual) are also employed to warn operators of a bag deteriorating condition so that manual corrections can be made.

DETAILED DESCRIPTION OF A PREFERRED EMBODIMENT OF THE INVENTION

FIG. 1 schematically illustrates the particulate separator system of the present invention;

FIG. 2 is a perspective illustration of the system of FIG. 1 showing broken-away sections of the principle equipment associated therewith; and FIG. 3 is a partially sectioned, perspective illustration of a typical cyclone separator tube.

The particulate separator system of the present invention is schematically depicted in FIG. 1 and includes a primary cyclone separator 2, a secondary bag house separator 4 coupled to the cyclone separator 2 so as to receive a small (i.e., 10%–20%) portion of the gases flowing through the cyclone 2. Gases from a boiler enter the cyclone 2 thorugh an inlet 6 duct or conduit, pass through the cyclone 2 and eventually exit through duct or conduit 8. A blower 10 induces draft through separator 2 and discharges the gases to a stack 11 via duct 13.

The bag house filter 4 is in side stream relation to the cyclone separator 2. A portion of the combustion gases are withdrawn from the cyclone 2 and conveyed to the bag house filter 4 via ducts 32, 12 and 14. The figures illustrate only two outlet ducts 32 communicating the cyclone 2 to the conduit 12. In practice, several more are used and can be located around the entire periphery of the cyclone 2 just below the tube sheet as will be discussed. A second blower 16 induces draft through the side stream system bag filter and discharges substantially departiculatized gas to the duct 8 via duct 18. Particles entrained in the gas traversing the conduits 32, 12 and 14 are trapped on the surface of the filter media (i.e. bags) contained within the bag house 4. The entrapped particles are periodically removed from the surface of the filter media by bursts of air applied to the bags which causes the particles to fall from the bags and into the collection hopper 20 at the bottom of the bag house 4. More specifically, removal takes place by directing a pulse-jet of compressed air down through the inside of the filter bag. The air sets up a "shock-wave", which travels down the length of the bag dislodging the particulate as it goes. The dust then falls into the collecting hopper. A timer is generally supplied which permits pulsing of a different row of bags at different time intervals, usually determined by the pressure drop across the unit. The compressed air used for pulsing should be as dry as possible to prevent any possible reaction of water with sulfur in the gas to form sulfuric acid. This could result in deterioration of filter bags. If the bag filter is to be located outside, exposed to weather, it should be totally insulated to minimize any possibility of condensation which could again result in bag deterioration. Valve 24 serves to adjust the flow rate of gas through the ducts 12 and 14, and hence, controls the percentage of the total gas flow that will be shunted off through the bag house 4.

The temperature of the gases entering the bag house is controlled within the prescribed limits. In the embodiment shown, the hot boiler gases are cooled by drawing ambient air into the duct 14 via duct 22. A Motor controlled valve 26 in the conduit 22 is responsive to the temperature of the gas in the duct 14 and serves to adjust the flow of ambient air to be mixed with the gases in the conduits 12 and 14, and hence, controls the temperature of the gas in conduit 14 entering the bag house 4. A temperature probe 28 senses the temperature of the gas in the conduit 14 and, via appropriate well known commercially available instrumentation (generally indicated by the control means 30), automatically cntrols modulation of the air valve 26 for proper dilution cooling of the gas in duct 12.

FIGS. 2 and 3 show more detail of the cyclone 2 and bag filter 4. The cyclone 2 comprises a housing 34 which is divided into three chambers. Gas from the boilers enters an inlet chamber 36 and passes downwardly through cyclone tubes 37. The cyclone tubes 37 comprise concentric entrance (i.e. outer) and exit (i.e. inner) tubes 38 and 42 respectively. Gases entering the cyclone tubes 37 pass between the entrance tubes 38 and the exit tubes 43 and into a particulate collection chamber 40, where it reverses direction and passes upwardly through exit tubes 42 into outlet chamber 44 from whence it is pumped to the stack 11 by blower 10. A partition 46 (known as the tube sheet) separates the inlet chamber 36 from the particle collection chamber 40 and serves to support the entrance tubes 38 as best illustrated in FIG. 3. A second partition 47 is sealed around the several exit tubes 42 and separates the inlet chamber 36 from the outlet chamber 40. The gas entering the inlet chamber 36 passes downwardly through the annulus 48 between the entrance tube 38 and exit tube 42 and is diverted by the vanes 50 so as to create a swirling action within the entrance tube 38. This swirling action causes the heavier particles to be thrown by centrifugal force against the inside wall 52 of the entrance tube 38 from whence they fall by gravity and are discharged from the outlet 54 into an appropriate collection hopper 56.

A portion of the gases entering the dust collection chamber 40 are withdrawn through the side stream bag house separator 4 via appropriate conduits 32, 12, 14, etc. The conduits 32 are located slightly below the partition 46 which has proved effective in creating additional downward pull through the cyclone tubes 37. This additional downward pull tends to reduce reentrainment of the smaller particles in the stream exiting collection chamber 40 through the tubes 42 and causes additional particulate matter to fall out to the particulate hopper 56. Hence, not only is a portion (i.e., 10%–20%) of the gas passed through an absolute filter 4, but withdrawing the gas at this location in the cyclone actually increases the efficiency of the cyclone itself with respect to fine particles. The portion of gas drawn from the particulate collection chamber 40 is directed to the bag house 4. The bag house 4 is of conventional design and comprises a plurality of tubular filter bags 58 depending from a partition 60. The partition 60 divides the bag house 4 into two chambers, while the filter bags 58 separate the particle-laden gas in one chamber from the particle-free gas in the other. More specifically, a first or vestibule chamber 62 receives the particle laden gas from the duct 14 while an exhaust chamber 64 receives the departiculatized gas passing through the filter bags 58. Thereafter, the departiculatized gas is pumped from the exhaust chamber back to the primary gas stream in the duct 8 for ultimate release to the atmosphere.

Systems constructed and tested in accordance with the present invention employed commercially available cyclone separators known as "MULTICLONES" manufactured by the Western Precipitation Division of the Joy Manufacturing Co. The bag house filters were also commercially available and known as Pulseflo filters also manufactured by Western. One test installation was installed to accommodate about 20,000 CFM of combustion gas at about 500° F. About 4500 CFM was diverted from the cyclone to the bag house and cooled with about 450 CFM of 80° F. dilution air to a bag house inlet temperature of about 350°–400° F. Nylon felted bags, known in the art by the name "NOMEX" were used in the bag house.

In terms of particulate emissions, one test showed that with the boiler operating at full load, 5.6% of the gas stream passing through the cyclone 2 was drawn off to the side stream bag house 4 and particulate emissions were reduced approximately 27% below what the cyclone was achieving alone. Additional tests were run with the boiler at half load putting 12% of the gas flow through the side stream bag house. This resulted in a 50% reduction in the particulates as compared to the use of the cyclone alone. In still another series of tests, a side stream bag house system such as described above was added to a 52,000 lb/hr boiler and tests run at full and half loads. During these tests, the inlet and outlet of the bag house was sampled as well as the outlet of the boiler stack itself. At full load and with 15% of the total gases being passed through the side stream bag house, particulate emissions decreased 50% (i.e., 0.35 lbs/MMBtu to 0.17 lbs/MMBtu) from what they would have been with just the cyclone separator alone.

The embodiments of the invention in which an exclusive property or privilege is claimed are defined as follows:

1. In combination with a coalfired boiler emitting a hot, effluent rich in large and small particulates above and below about 10 microns respectively, a separator system for substantially removing said particulates from said effluent prior to discharging said effluent to a stack, said system comprising: a primary separator including a housing, inlet and outlet chambers in said housing, a particulate collection chamber beneath said inlet chamber, a partition separating the collection chamber from the inlet chamber and a plurality of cyclonic separator tubes extending through the partition providing effluent flow communication between said inlet, outlet and collection chambers, said cyclonic tubes each comprising spaced-apart inner and outer concentric tubes for whirling said particulate-rich effluent downwardly therebetween to centrifugally separate primarily said large particulates from said effluent for collection in said collection chamber and to yield a particulate-lean effluent containing primarily said small particulates for passage into said outlet chamber through said inner tube; and exhaust duct means communicating said outlet chamber with said stack; first suction means for drawing said effluent from said outlet chamber and through said exhaust duct means for discharge to said stack; and a secondary separator for substantially completely removing said small particulates from a minor portion of said particulate-lean effluent, said secondary separator comprising a vestibule chamber, an exhaust chamber, porous, effluent-sensitive filter media between said vestibule and exhaust chambers for entrapping said small particulates from said portion and substantially preventing their passage from said vestibule chamber into said exhaust chamber so as to yield a substantially particulate-free effluent from said exhaust chamber; a first conduit communicating said collection chamber with said vestibule chamber for passing said portion to said vestibule chamber; valve means positioned and arranged in said first conduit for controlling the flow of said minor portion through said secondary separator; a second conduit communicating said exhaust chamber with said exhaust duct means for passing said particulate-free effluent to said stack; second suction means for drawing said portion from said collection chamber through said secondary separator and said first and second conduits for discharge to said exhaust duct means and said stack, said second suction means being positioned and arranged such that it additionally creates a downward pull in said collection chamber for enhancing the collection efficiency of said primary separator with respect to said large particulates and reducing reentrainment of said small particulates in said particulate-lean effluent; inlet duct means positioned and arranged for admitting ambient air into said first conduit; motorized valve means positioned and arranged in said inlet duct means for modulating the admission of ambient cooling air into said first conduit for dilution cooling of said portion; means for sensing the temperature of the portion in said first conduit; and control-means connected to said sensing and said motorized valve means for controlling said motorized valve means in response to the temperature of said portion and such as to maintain the temperature of the gas entering said second separator above its acid dew point and below the thermal degradation temperature of said media.

* * * * *